(12) United States Patent
Lee et al.

(10) Patent No.: US 6,869,224 B2
(45) Date of Patent: Mar. 22, 2005

(54) APPARATUS FOR SEALING A WATER PUMP BEARING

(75) Inventors: Kwang-Joo Lee, Gyeongsangnam-do (KR); Ki-Hong Jang, Gyeongsangnam-do (KR)

(73) Assignee: FAG Bearings Korea Corp., Gyeongsangnam-do (KR)

( * ) Notice: Subject to any disclaimer, the term of this patent is extended or adjusted under 35 U.S.C. 154(b) by 26 days.

(21) Appl. No.: 10/641,624

(22) Filed: Aug. 15, 2003

(65) Prior Publication Data

US 2004/0037480 A1 Feb. 26, 2004

(30) Foreign Application Priority Data

Aug. 19, 2002 (KR) ........................................ 2002/48857

(51) Int. Cl.[7] .............................................. F16C 33/78
(52) U.S. Cl. ........................................ 384/486; 384/482
(58) Field of Search ................................ 384/486, 482, 384/484, 140, 147

(56) References Cited

U.S. PATENT DOCUMENTS

| | | | |
|---|---|---|---|
| 4,516,783 | A | 5/1985 | Mitsue et al. |
| 4,799,808 | A | 1/1989 | Otto |
| 5,096,207 | A | 3/1992 | Seeh et al. |
| 5,105,001 | A | 4/1992 | Goins et al. |
| 5,269,536 | A | 12/1993 | Matsushima et al. |
| 5,292,199 | A | 3/1994 | Hosbach et al. |
| 5,553,870 | A | 9/1996 | Czekansky et al. |
| 6,082,905 | A | 7/2000 | Vignotto et al. |
| 6,170,992 | B1 | 1/2001 | Angelo et al. |
| 6,217,225 | B1 | 4/2001 | Shimizu et al. |
| 6,257,587 | B1 | 7/2001 | Toth et al. |
| 6,280,093 | B1 | 8/2001 | Ohtsuki et al. |
| 2002/0001422 | A1 | 1/2002 | Maldera et al. |
| 2002/0131659 | A1 | 9/2002 | Rutter et al. |

FOREIGN PATENT DOCUMENTS

| | | |
|---|---|---|
| JP | 2890355 | 2/1999 |
| JP | 13161432 | 2/2001 |

OTHER PUBLICATIONS

New Products. Water Pump Bearings with High Performance Seals. *Motion & Control*, No. 3 (1997).
SKF Seal Executions. Hub Units–Seal Executions, no date.
Koyo. High Performance Water Pump Bearings, no date.

*Primary Examiner*—Lenard A. Footland
(74) *Attorney, Agent, or Firm*—Merchant & Gould P.C.

(57) ABSTRACT

The present invention discloses an apparatus for sealing a water pump bearing in which the bearing comprises a plurality of rolling elements arranged between an inner race and an outer race, a retainer for maintaining a prescribed space between each rolling element, and a seal coupled to a tip end of an opening in the space formed between the inner race and the outer race. The seal comprises a first seal equipped with a first reinforcing frame that is inserted into an inner axial section of bearing, and a second seal equipped with a second reinforcing frame that is inserted into an outer axial section of the bearing for coupling with the first seal. The first seal further comprises a first seal element that is inserted into an inner radial section of the first reinforcing frame and has two seal lips abutted to an inner radial section of the second reinforcing frame, and the second seal further comprises a second seal element that is inserted into an outer radial section of the second reinforcing frame and has two seal lips abutted to a central radial section of the first reinforcing frame, such that leakage of grease in the apparatus is prevented, and moisture, foreign particles and mixtures thereof are avoided from penetrating into the bearing, thereby increasing the durability of the water pump bearing.

3 Claims, 3 Drawing Sheets

APPARATUS FOR SEALING A WATER PUMP BEARING

FIELD OF THE INVENTION

The present invention relates to a water pump. More particularly, the present invention relates to an apparatus for sealing a water pump bearing.

BACKGROUND OF THE INVENTION

Conventional water pump bearings for water pump assembly used in cooling systems for automobiles and agricultural and industrial purposes are disposed with a plurality of rolling elements 6 between an inner race 2 and an outer race 4, as illustrated in FIG. 1. A retainer 8 is formed for maintaining the plurality of rolling elements in a prescribed space (S). A seal 10 is coupled to a tip end of an opening of the space (S) formed between the inner race 2 and the outer race 4 for preventing foreign particles from entering the space. The seal 10 is made of a reinforced frame 12 of cold rolling material bent in a prescribed shape, abutted by a sealing material 14 and push-fitted into a hitching groove band 4a formed at an outer race 4 of a bearing.

The sealing material 14 is formed therein, that is, at an area abutted by an outer surface of the inner race 2, with a first seal lip 14a and a second seal lip 14b. The first seal lip 14a is formed within the space (S) to prevent grease in the space (S) from leaking and the second seal lip 14b is formed outside of the space (S) to prevent foreign particles or moisture mixed therewith from entering the space (S) from the outside.

Recently, due to improved performance of engines used in water pumps, demand for sophisticated bearings has gradually increased, resulting in the need to improve the sealing and foreign particle preventing function of the seal that greatly affects the performance of bearings.

There are many factors that cause damage to water pump bearings. A malfunctioning of lubrication caused by grease leakage and penetration of foreign particles, moisture and mixture therewith into the bearings are the most common causes. Life of bearings is directly related to grease leakage and penetration of moisture, foreign particles and mixture therewith into the bearings.

Although the first seal lip 14a and the second seal lip 14b in conventional bearings for water pumps have somewhat helped repel grease leakage and penetration of moisture and foreign particles, there are still drawbacks in that the bearings are always exposed to outside foreign particles failing to fully prevent mixture or penetration thereof. And particularly, when bearings are exposed to water, lots of moisture can seep in to cause damage to the bearings.

SUMMARY OF THE INVENTION

The present invention provides an apparatus for sealing a water pump bearing adapted to greatly improve the function of preventing entry of foreign particles, moisture, and a mixture thereof into the bearings, thereby improving the durability of the bearings.

In accordance with an embodiment of the present invention, the apparatus for sealing a water pump bearing comprises a plurality of rolling elements disposed between an inner race and an outer race and a retainer for maintaining a prescribed space between each rolling element. A seal is coupled to a tip end of an opening in the space formed between the inner race and the outer race. The seal comprises a first seal equipped with a first reinforcing frame that is inserted into an inner axial section of the bearing and a second seal equipped with a second reinforcing frame that is inserted into an outer axial section of the bearing for coupling with the first seal. The first seal further comprises a first seal element that is inserted into an inner radial section of the first reinforcing frame and has two seal lips abutted to an inner radial section of the second reinforcing frame.

The second seal further comprises a second seal element that is inserted into an outer radial section of the second reinforcing frame and has two seal lips abutted to a central radial section of the first reinforcing frame.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE PREFERRED EMBODIMENT

Hereinafter, the preferred embodiment of the present invention will be described in detail with reference with the accompanying drawings.

Figure 3:
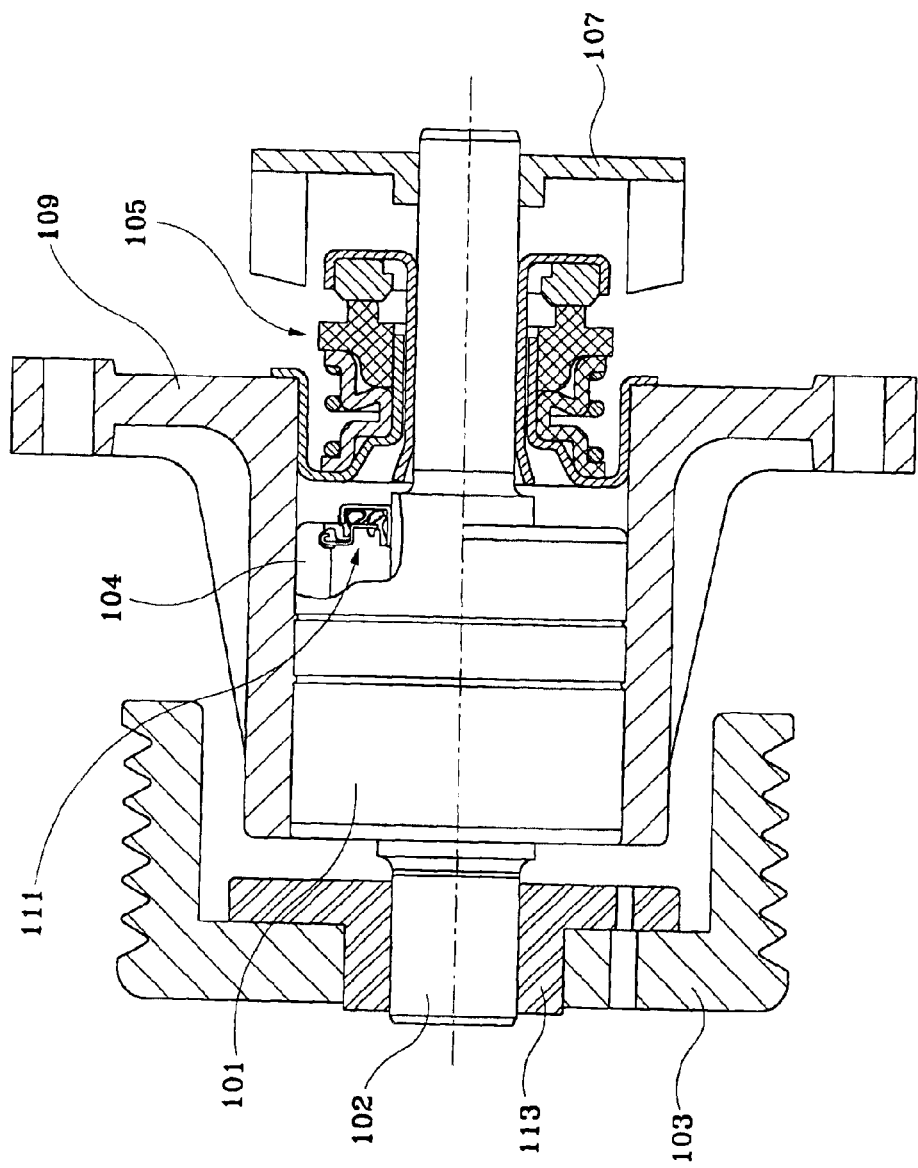
FIG. 3 is a sectional view for illustrating a water pump assembly applied with a sealing apparatus of a water pump bearing according to an embodiment of the present invention.

A water pump assembly used in a cooling system of an engine for automobiles and agricultural and industrial purposes is shown in FIG. 3, where reference numeral 101 is a water pump bearing, 113 is a bracket, 103 is a water pump pulley, 109 is a water pump housing, 105 is a mechanical seal assembly, 107 is an impeller and 111 is a sealing apparatus.

The water pump bearing 101 is push-fitted into the water pump housing 109. The mechanical seal assembly, the impeller 107 and the bracket 113 are push-fitted into an inner race 102 of the water pump bearing. The sealing apparatus 111 is coupled to a space formed between the inner race 102 and the outer race 104 of the water pump bearing. The water pump pulley 103 coupled to the bracket 113 is driven by a belt. The mechanical seal assembly 105 primarily prevents entry of coolant and then secondarily the sealing apparatus 111 prevents penetration of foreign particles.

Figure 1:
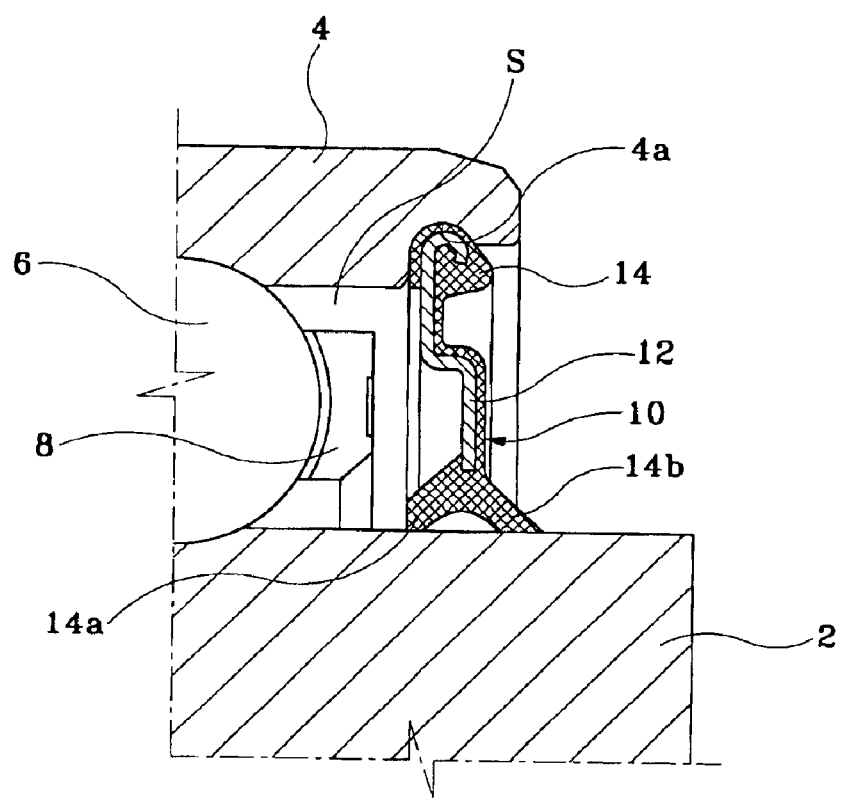
FIG. 1 is partial sectional view for illustrating a water pump bearing applied with a sealing apparatus according to the prior art.
Figure 2:
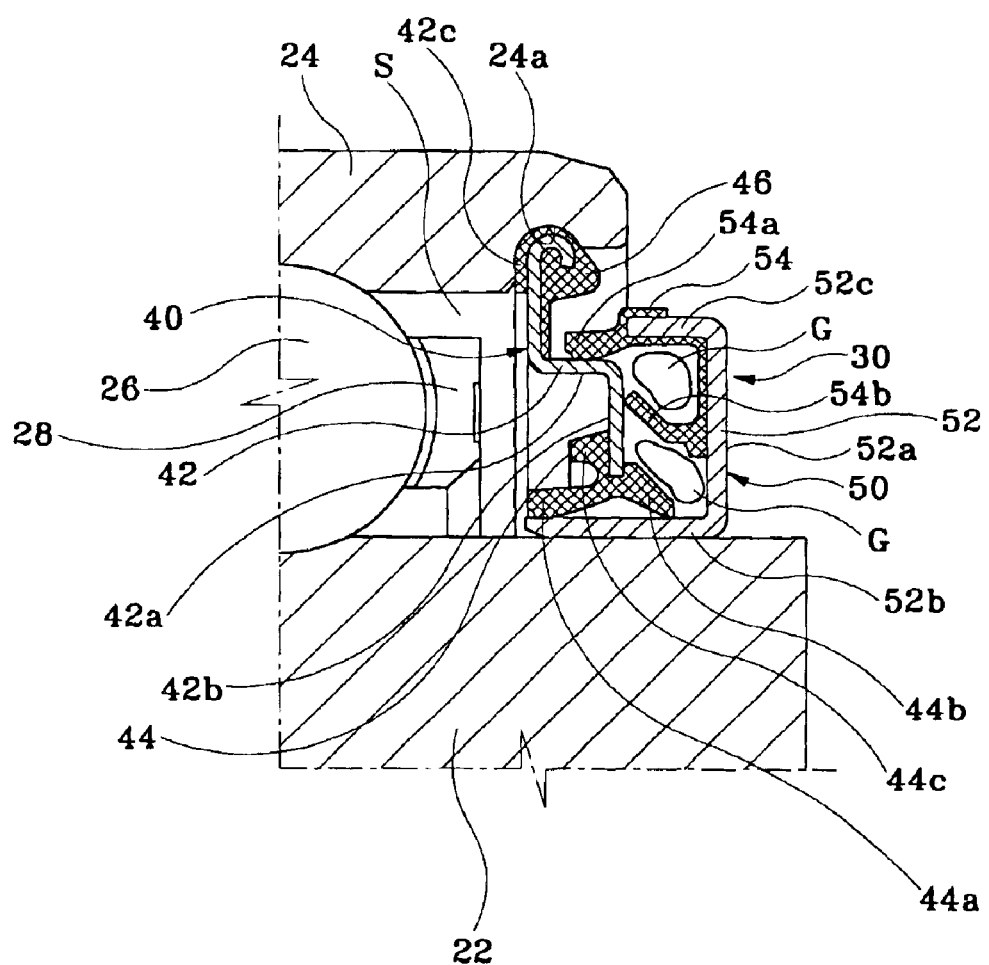
FIG. 2 is a partial sectional view for illustrating a water pump bearing applied with a sealing apparatus according to an embodiment of the present invention.

The sealing apparatus 111 is illustrated in detail in FIG. 2. As depicted in the drawing (reference numerals are indicated differently from those of FIG. 3), there is arranged a plurality of rolling elements 26 between an inner race 22 and an outer race 24.

A prescribed space is maintained between each rolling element 26 by a retainer 28 that encompasses the entire rolling elements 26. A seal 30 is coupled to a tip end of an opening of the space (S) formed between the inner race 22 and the outer race 24 for preventing foreign particles from entering the space (S). A hitching groove band 24a is circumferentially formed at an inner peripheral margin of outer race 24 to allow the seal 30 to be hitched thereat.

The seal 30 includes a first seal 40 which has a first reinforcing frame 42 and is inserted into an inner axial direction of the bearing. The seal 30 also includes a second seal 50 which has a second reinforcing frame 52 and is inserted into an outer axial direction of the bearing to be coupled to the first seal 40.

The first seal 40 further includes a first seal element 44 inserted into an inner radial direction of the first reinforcing frame 42 and a third seal element 46 inserted into an outer radial direction of the first reinforcing frame 42 to be push-fitted to the hitching groove band 24a. The first seal element 44 and the third seal element 46 may be connected to merge, thereby forming an integral element, at which time, a part of the first reinforcing frame which is to be tightly abutted by a second seal element (described later) is exposed to the outside, and the first seal element 44 and the third seal element 46 that have integrally become one element encompass the first reinforcing frame.

The first reinforcing frame 42 comprises a web 42a centrally formed in the axial direction of the bearing, and inner and outer flanges 42b and 42c extensively formed from both tip ends of the web 42a in the radial direction of the bearing, each facing in an opposite direction. The inner flange 42b is vertically embedded into the first seal element 44 while the outer flange 42c is bent at a tip end thereof to be embedded into the third seal element 46.

The first seal element 44 is formed thereunder with first and second seal lips 44a and 44b. The first seal lip 44a is spread toward an inner axial direction of the bearing to be abutted at a cross-sectional surface thereof to an external surface of an inner flange (described later) of the second reinforcing frame 52. The second seal lip 44b is spread toward an outer axial direction of the bearing to be abutted at a cross-sectional surface thereof to an external surface of an inner flange (described later) of the second reinforcing frame 52. A section where the first and second seal lips 44a and 44b are merged is formed thereon with a reinforcing part 44c that protrudes into the axial direction of the bearing. The second seal 50 includes a second seal element 54 inserted into an external radial direction of the second reinforcing frame 52.

The second reinforcing frame 52 is disposed with a web 52a centrally formed toward the radial direction of the bearing, and inner and outer flanges 52b and 52c extensively formed from both tip ends of the web 52a toward the first reinforcing frame 42 in the axial direction of the bearing, and has a cross-sectional view of a ⊂ shape. The outer flange 52c and the web 52a are tightly abutted by the second seal element 54.

Furthermore, the inner flange 52b is tightly abutted at an inner surface thereof to an external surface of the inner race 22 and is touched at an external surface thereof by first and second seal lips 44a and 44b of the first seal element 44.

The second seal element 54 is protrusively formed with a third seal lip 54a that is abutted to an external surface of the web 42a of the first reinforcing frame 42 and is also protrusively formed with a fourth seal lip 54b that is abutted to an external surface of the inner flange 42b of the first reinforcing frame 42. A small quantity of grease (G) is filled in a space between the second seal lip 44b and the fourth seal lip 54b and a space between the fourth seal lip 54b and the third seal lip 54a to provide lubrication to the lips.

The first reinforcing frame 42 and the second reinforcing frame 52 are made of stainless steel that is highly resistant to corrosion as these frames are always in danger of being exposed to moisture. The first, second and third seal ele ments 44, 54 and 46 are made of rubber but may be made of various types of synthetic resins.

In the apparatus for sealing a water pump bearing thus described according to the present invention, the third seal element 46 of the first seal 40 is initially inserted into the hitching groove band 24a at the outer race 24, and an inner surface of the inner flange 52b at the second reinforcing frame 52 of the second seal 50 is tightly abutted and push-fitted to an outer surface of the inner race 22, whereby the second seal 50 is rotated along with the inner race 22.

The first seal lip 44a and the second seal lip 44b both function to prevent leakage of the grease contained in the bearings. The third seal lip 54a, in the first place, functions to keep the moisture and mixture of foreign particles therewith from entering, and rotates together with the inner race 22 of the bearings to push out foreign particles and moisture. The fourth seal lip 54b then functions to prevent entry of moisture and foreign particles and, at this time, the grease (G) for lubricating the seal lips forms a lubrication films between an outer surface of the first reinforcing frame 42 and the fourth seal lip 54b to further enhance the penetration prevention effect of moisture.

The foregoing description of the preferred embodiment of the invention has been presented for the purpose of illustration and description. It is not intended to be exhaustive or to limit the invention to the precise form disclosed. Modifications and variations are possible in the light of the above teachings or may be acquired from practice of the invention.

What is claimed is:

1. An apparatus for sealing a water pump bearing, the water pump bearing comprising:

a plurality of rolling elements arranged between an inner race and an outer race;

a retainer for maintaining a prescribed space between each rolling element;

a seal coupled to a tip end of an opening in the space formed between said inner race and said outer race, wherein said seal comprises: a first seal equipped with a first reinforcing frame and inserted into an inner axial section of the bearing; and a second seal equipped with a second reinforcing frame and inserted into an outer axial section of the bearing for coupling with said first seal, wherein said first seal further comprises: a first seal element inserted into an inner radial section of said first reinforcing frame and having two seal lips abutted to an inner radial section of said second reinforcing frame; and said second seal further comprises a second seal element inserted into an outer radial section of said second reinforcing frame and having two seal lips abutted to a central radial section of said first reinforcing frame.

2. The apparatus as defined in claim 1, wherein said first reinforcing frame further comprises: a web centrally formed in an axial direction of the bearing; and inner and outer flanges formed at both tip ends of said web, each flange facing in an opposite direction and extended in the radial direction of the bearing, while said second reinforcing frame further comprises: a web centrally formed in a radial direction of the bearing; and inner and outer flanges formed at both tip ends of the web, each flange extended toward the first reinforcing frame in the axial direction of the bearing, wherein said two seal lips at said first seal element are abutted to an external surface of said inner flange of said second reinforcing frame, while one seal lip at said second seal element is abutted to an external surface of said web of said first reinforcing frame and the other seal lip at said second seal element is abutted to an external surface of said inner flange of said first reinforcing frame.

3. The apparatus as defined in claim 2, wherein a space between the seal lips of said first seal element and said seal lips of said second seal element is filled with grease for lubrication of said seal lips.

* * * * *